United States Patent
Tabatowski-Bush

(10) Patent No.: US 8,239,082 B2
(45) Date of Patent: Aug. 7, 2012

(54) METHOD AND SYSTEM FOR ENHANCING FUEL ECONOMY OF A HYBRID ELECTRIC VEHICLE

(75) Inventor: Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/903,281

(22) Filed: Oct. 13, 2010

(65) Prior Publication Data

US 2011/0166729 A1 Jul. 7, 2011

(51) Int. Cl.
*B60L 9/00* (2006.01)
(52) U.S. Cl. .......................................... 701/22
(58) Field of Classification Search ........................ None
See application file for complete search history.

(56) References Cited

U.S. PATENT DOCUMENTS

| | | | |
|---|---|---|---|
| 5,291,960 A * | 3/1994 | Brandenburg et al. | 180/65.27 |
| 5,871,859 A * | 2/1999 | Parise | 320/150 |
| 7,490,000 B2 | 2/2009 | Siddiqui et al. | |
| 7,735,331 B2 * | 6/2010 | Zhu et al. | 62/259.2 |
| 2006/0155453 A1 | 7/2006 | Han et al. | |
| 2008/0066476 A1 * | 3/2008 | Zhu et al. | 62/133 |
| 2009/0139781 A1 * | 6/2009 | Straubel | 180/65.1 |
| 2011/0166729 A1 * | 7/2011 | Tabatowski-Bush | 701/22 |

FOREIGN PATENT DOCUMENTS

| | | |
|---|---|---|
| JP | 11266501 A | 9/1999 |
| JP | 2006311769 A | 11/2006 |
| WO | 2007118763 A1 | 10/2007 |

\* cited by examiner

*Primary Examiner* — Thomas Tarcza
*Assistant Examiner* — Nagi Murshed
(74) *Attorney, Agent, or Firm* — David E. Kelley; Brooks Kushman P.C.

(57) ABSTRACT

A method and system is disclosed for enhancing fuel economy of a hybrid electric vehicle (HEV) with a high-voltage storage battery and a heat transfer device. Whether a user has elected to enhance the fuel economy of the HEV is determined. When the user has elected to enhance the fuel economy, a command signal is generated increasing operation of the heat transfer device to reduce a temperature of the high-voltage storage battery.

19 Claims, 2 Drawing Sheets

METHOD AND SYSTEM FOR ENHANCING FUEL ECONOMY OF A HYBRID ELECTRIC VEHICLE

BACKGROUND

1. Technical Field

Fuel economy modification in hybrid electric vehicles.

2. Background Art

A hybrid electric vehicle (HEV) typically includes an engine, such as an internal combustion engine (ICE), and an electric motor. For example, the HEV may be a series hybrid electric vehicle (SHEV), a parallel hybrid electrical vehicle (PHEV), or a parallel/series hybrid electric vehicle (PSHEV).

The series hybrid electric vehicle (SHEV) is a vehicle with an engine (most typically an ICE) connected to an electric machine, which provides electric power to a battery. Another electric machine called a traction motor is powered by the battery. The traction motor in the SHEV is the sole source of wheel torque. There is no mechanical connection between the engine and the drive wheels.

The parallel hybrid electrical vehicle (PHEV) has an engine (most typically an ICE) and an electric motor that work together to provide traction wheel torque to drive the vehicle. In addition, the motor in the PHEV can be used as a generator to recover regenerative power to charge the battery.

The parallel/series hybrid electric vehicle (PSHEV) has characteristics of both PHEV and SHEV configurations and is sometimes referred to as a "split" parallel/series configuration. In one of several types of PSHEV configurations, the engine is mechanically coupled to two electric machines in a planetary gear-set transaxle. A first electric machine, the generator, is connected to a sun gear. The engine is connected to a planetary carrier. A second electric motor, a traction motor, is connected to a ring (output) gear via additional gearing in a transaxle. The generator can also contribute to the necessary wheel (output shaft) torque.

During operation of a HEV, the ICE consumes fuel and produces undesirable engine emissions. However, it may be desirable or necessary to increase fuel efficiency of the HEV as well as reduce the amount of undesirable engine emissions as the HEV is operated. Furthermore, it may be desirable or necessary to control the fuel consumption in the HEV to compensate for vehicle-to-vehicle variability, vehicle aging, and calibration inaccuracies in the HEV powertrain.

SUMMARY

A method and system is provided for enhancing fuel economy of a hybrid electric vehicle (HEV) with a high-voltage storage battery and a heat transfer device. Whether a user has elected to enhance fuel economy of the HEV is determined. When the user has elected enhancement of the fuel economy, a command signal is generated. The command signal increases operation of the heat transfer device to reduce a temperature of the high-voltage storage battery.

DETAILED DESCRIPTION

Embodiments of the present disclosure include a method and system for enhancing fuel economy of a hybrid electric vehicle (HEV). The vehicle may be any type of HEV that includes a high-voltage storage battery and a heat transfer device for transferring heat away from the storage battery. The HEV may be, for example, a plug-in hybrid electric vehicle, a hybrid fuel cell electric vehicle (FCEV), or battery-replacement electric vehicle.

Figure 1:
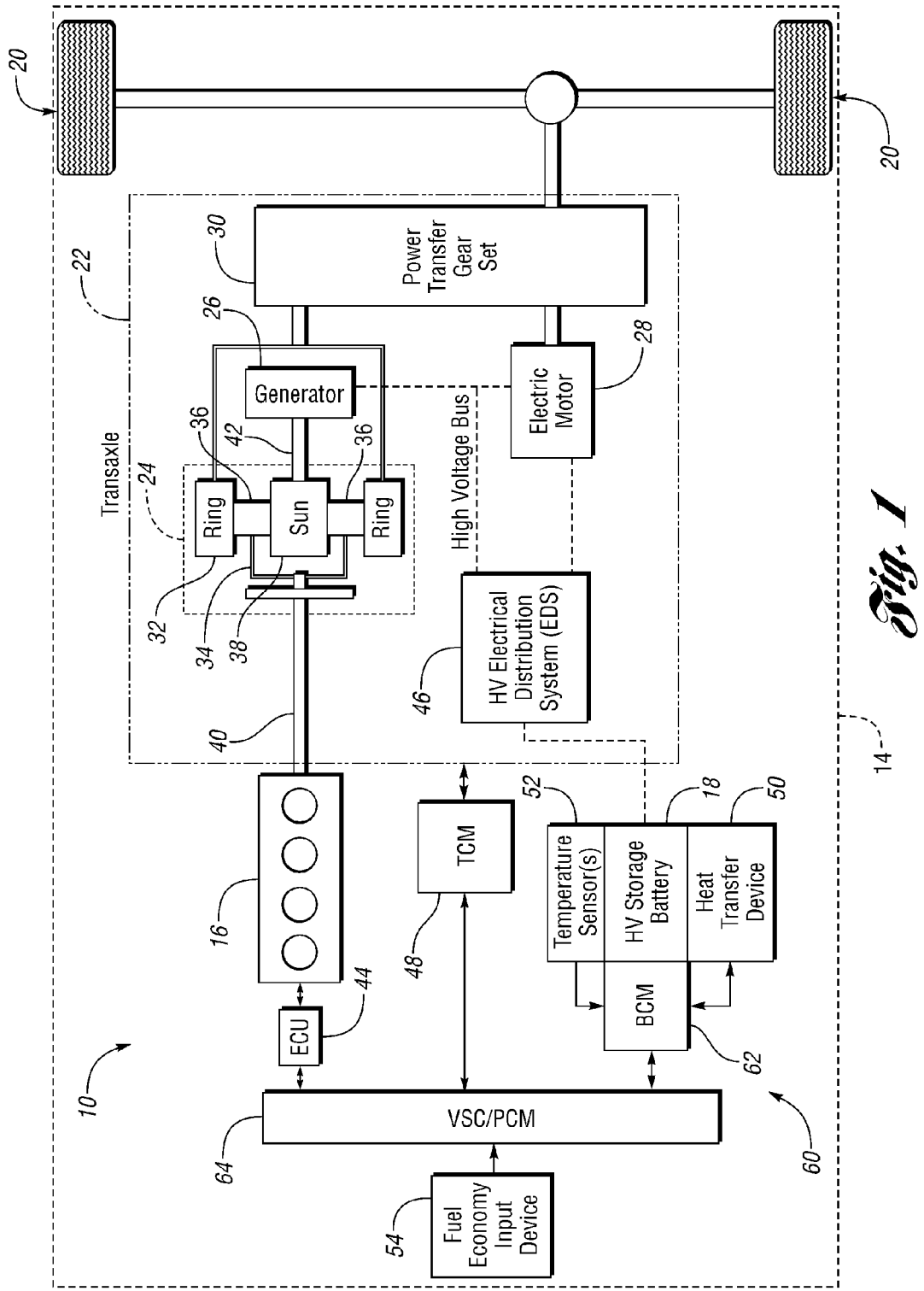
FIG. 1 is a schematic diagram illustrating a hybrid electric vehicle (HEV) with a high-voltage storage battery, a heat transfer device, and a system for enhancing fuel economy of the HEV in accordance with one embodiment.

With reference to FIG. 1, a system 10 is provided for enhancing fuel economy of a hybrid electric vehicle (HEV) 14. The system 10 of FIG. 1 is shown integrated with a powertrain of a parallel/series hybrid electric vehicle (PSHEV). However, the system 10 may be integrated with other powertrain configurations, such as a series hybrid electric vehicle (SHEV) or a parallel hybrid electric vehicle (PHEV). The system 10 and its method of operation are described in a general fashion to facilitate understanding of various aspects of the system 10 and method.

As illustrated in FIG. 1, the HEV 14 includes an engine 16, a high-voltage storage battery 18 (hereinafter "HV battery"), and drive wheels 20. The engine 16 of FIG. 1 is shown as an internal combustion engine (ICE) that consumes gasoline, diesel, or other combustible fuel to power the HEV 14. The HV battery 18 outputs or stores electrical power. The HV battery 18 may be, for example, a lithium ion battery that has a plurality of lithium ion cells. The cells in the HV battery 18 can be connected in series to provide a high-voltage output, such as 300 volts. In operation, the engine 16 and the HV battery 18 selectively provide power to the drive wheels 20 to propel the HEV 14. However, the HV battery 18 generates heat or thermal energy during operation. The temperature of the HV battery 18 increases when the HV battery 18 generates heat, which then reduces the power limits of the HV battery 18. As the power limits of the HV battery 18 decrease, battery electric power available for driving components in the transaxle 22 decreases. Consequently, additional combustible fuel is needed to drive components in the transaxle 22 and the fuel economy of the HEV 14 decreases. Thus, the HV battery 18 may be cooled to a lower temperature to increase or enhance the fuel economy of the HEV 14. The system 10 may be used to reduce the temperature of the HV battery 18 to increase or enhance the fuel economy of the HEV 14.

As shown in FIG. 1, the HEV 14 includes a transaxle 22, which is analogous to a transmission in a conventional automotive vehicle. The transaxle 22 includes power-split gearing 24, an electric generator 26, an electric motor 28, and a power transfer gear set 30. The transaxle 22 is disposed between the drive wheels 20 and the engine 16 to effect power transfer to the drive wheels 20.

As depicted in FIG. 1, the power-split gearing 24 of the transaxle 22 mechanically connects the engine 16 and the electric generator 26. The power-split gearing 24 may be a planetary gear set having a ring gear 32, a carrier 34, planet gears 36, and a sun gear 38. An engine drive shaft 40 drivably connects the engine 16 and the carrier 34. A generator drive shaft 42 mechanically connects the electric generator 26 and the sun gear 38. Alternatively, the power-split gearing 24 may include other types of gear sets and transmissions for coupling the engine 16 and the electric generator 26.

As depicted in FIG. 1, the HEV 14 includes an engine control unit 44 (ECU). The ECU 44 may include an electronic engine throttle control (ETC) system. In operation, the ECU 44 controls the engine 16 and the engine 16 outputs torque to the engine drive shaft 40, which is connected to the power-split gearing 24. The power-split gearing 24 receives power from the engine 16 through the engine drive shaft 40 and transfers the power either to the drive wheels 20 through the power transfer gear set 30 or to the electric generator 26. In addition to receiving mechanical power from the engine 16, the power-split gearing 24 can also receive mechanical power from the electric generator 26.

As shown in FIG. 1, the HEV 14 may include a high-voltage electrical distribution system 46 (hereinafter "EDS"). The EDS 46 can receive the electric energy from the electric generator 26 and distribute the electrical energy between the HV battery 18 and the electric motor 28. For example, one or more AC-to-DC power converters in the EDS 46 may convert the AC electrical power from the electric generator 26 to DC voltage power that is suitable to charge the HV battery 18. Similarly, the EDS 46 can receive electric energy from the HV battery 18 and/or the electric motor 28 and distribute the electric energy to the electric motor 28, the electric generator 26, or a combination thereof. For example, the EDS 46 may include one or more DC-to-AC power converters to convert DC electrical power from the HV battery 18 to AC power that is suitable for driving the multi-phase induction electric motor 28.

As illustrated in FIG. 1, the electric generator 26 can be used as either an electric motor, or a machine that converts mechanical energy into electrical energy. Operating as an electric motor, the electric generator 26 outputs torque to generator drive shaft 42 connected to the power-split gearing 24, which can transfer torque to ring gear 32 to the torque input side of the power transfer gear set 30. Because the sun gear 38 acts as a torque reaction element, the electric generator 26 can control the speed of the engine 16. When operating as a machine that converts mechanical energy into electrical energy, the electric generator 26 outputs electrical power to EDS 46 through the high voltage bus. The EDS 46 receives the electrical power from the electric generator 26 and converts and/or distributes the electric power for the electric motor 28 and/or the HV battery 18.

Referring to FIG. 1, the HEV 14 may include one or more controllers to control the transaxle 22, such as a transaxle control module (TCM) 48. The TCM 48 is configured to control specific components within the transaxle 22, such as the EDS 46, the electric generator 26, and the electric motor 28. In addition, the TCM 48 may provide data or information for the system 10 to enhance the fuel economy of the HEV 14. For example, the TCM 48 may obtain data or information including the speed of the engine 16, motor speed $\omega_{mot}$, motor torque $\tau_{mot}$, generator speed $\omega_{gen}$, generator torque $\tau_{gen}$, battery power $P_{batt}$, and motor and generator power loss $P_{loss}$.

As shown in FIG. 1, the HEV 14 includes a heat transfer device 50. In operation, the heat transfer device 50 removes heat from the HV battery 18 in the HEV 14. Operation of the heat transfer device 50 can be controlled to provide different rates of cooling the HV battery 18. When the heat transfer device 50 is in an off mode or is operating in a limited mode, such as to reduce noise in the HEV 14, the temperature of the HV battery 18 increases.

Increasing operation of the heat transfer device reduces the temperature of the HV battery 18 and increases the fuel economy of the HEV 14. Increasing operation of the heat transfer device 50 may include increasing a rate that the heat transfer device 50 transfers heat away from the HV battery 18, increasing a time interval that the heat transfer device 50 transfers heat away from the HV battery 18, increasing a frequency that the heat transfer device 50 transfers heat away from the HV battery 18, or a combination thereof. Increasing operation of the heat transfer device 50 can help cool the HV battery 18 in an energy efficient manner. While the heat transfer device 50 is shown separate from the transaxle 22 in FIG. 1, the heat transfer device 50 may part of the HV battery 18 depending on the configuration of the HEV 14.

In one embodiment, the heat transfer device 50 may include a fan. The fan transfers heat away from the HV battery 18 by moving air around or near the HV battery 18 to cool the HV battery 18 to a lower temperature. Operation of the fan can be controlled to provide varying speeds or rates of air flow around or near the HV battery 18. For example, increasing operation of the heat transfer device 50 may include operating the fan at a higher speed to cool the HV battery 18 at a greater rate.

As shown in FIG. 1, the HEV 14 may include one or more thermal or temperature sensors 52. The temperature sensors 52 may be disposed near the HV battery 18 to sense a temperature of the HV battery 18. In operation, the temperature sensors 52 sense the temperature of the HV battery 18 and generate a signal indicating the temperature of the HV battery 18. The temperature sensors 52 may be, for example, thermistor sensors that indicate the temperature of the HV battery 18. While the temperature sensors 52 in FIG. 1 are shown separate from the HV battery 18, the temperature sensors 52 may integrated as part of the HV battery 18, such as between cells in the HV battery 18, depending on its configuration.

As depicted in FIG. 1, the HEV 14 may include a fuel economy input device 54. The fuel economy input device 54 allows a user to select to enhance the fuel economy of the HEV 14. For example, the fuel economy input device 54 may be a manual user input device, such as a graphical user interface (GUI), a switch, a knob, or a button to allow a user to select the fuel economy mode for the HEV 14. Alternatively, the fuel economy input device 54 may be an input device that is separate or remote from the HEV 14. For example, the fuel economy input device 54 may be a hand-held wireless device, such as a mobile phone or personal digital assistant, or other electronic device for obtaining user selection information.

With continuing reference to FIG. 1, the system 10 includes a logic device (LD) or controller 60. The controller or LD 60 can be implemented by various types or combinations of electronic devices and/or microprocessor-based computers or controllers. To implement a method of enhancing fuel economy of the HEV 14, the controller 60 may execute a computer program or algorithm embedded or encoded with the method and stored in volatile and/or persistent memory. Alternatively, logic may be encoded in a logic or gate array stored on one or more integrated circuit chips.

The memory may be computer-readable memory that stores the computer program or algorithm embedded or encoded with the method. The memory may store data or information about the various operating conditions or components in the HEV 14, such as the heat transfer device 50 and the HV battery 18. For example, the memory may store one or more predetermined temperatures for the HV battery 18, energy usage data of the heat transfer device 50, past temperature data of the HV battery 18, as well as historic or past usage data of the heat transfer device 50 and/or the HV battery 18. In addition, the memory may store predetermined speeds for the heat transfer device 50. The memory may be part of the controller 60. However, the memory may be positioned in any suitable location in the HEV 14 accessible by the controller 60.

The LD or controller 60 for enhancing fuel economy of the HEV 14 is shown as a battery control module (BCM) 62. Although the LD or controller 60 may be a single hardware device to enhance the fuel economy of the HEV 14, the controller or LD 60 may also include multiple controllers in the form of multiple hardware devices, or multiple software controllers within one or more hardware devices. Furthermore, the controller 60 may include additional hardware devices or software controllers, such as a vehicle system controller (VSC), a powertrain control module (PCM), or a combination thereof depending on the configuration of the system 10. The VSC and the PCM of FIG. 1 are shown combined into a single device and are hereinafter referenced as a "VSC/PCM" having reference numeral 64.

The VSC/PCM 64 communicates with a number of controllers in the HEV 14. For example, the VSC/PCM 64 communicates with the ECU 44 to control and obtain information regarding the engine 16 as well as with the TCM 48 to control and obtain information regarding specific components within the transaxle 22. In addition, the VSC/PCM 64 communicates with the BCM 62 to control and obtain information regarding the HV battery 18 and/or the heat transfer device 54.

The LD or controller 60 is configured to determine whether a user has selected or elected enhancement of the fuel economy of the HEV 14. For example, the controller 60 may receive and process a signal indicating whether the user has elected enhancement of the fuel economy of the HEV 14 either from the VSC/PCM 64, the fuel economy input device 54, or a combination of both the VSC/PCM 64 and the fuel economy input device 54 under supervisory control of the VSC/PCM 64.

As shown in FIG. 1, the controller 60 receives and processes one or more signals from the temperature sensors 52 to obtain an indication of temperature of the HV battery 18. For example, the temperature sensors 52 may sense a temperature of a plurality of cells in the HV battery 18 and transmit a sensor signal with the temperatures to the controller 60. The controller 60 processes the sensor signal from the temperature sensor 52 to determine the temperature of the HV battery 18. The controller 60 may estimate or determine the temperature in the HV battery 18 based on an average of battery cell temperatures.

The temperature sensors 52 may repeatedly provide temperature data to the controller 60 and the controller 60 may obtain a number of temperatures of the HV battery 18 based on the temperature data. For example, the controller 60 may estimate or determine the temperature in the HV battery 18 based on an average of temperature levels of the HV battery 18. In addition, the sensors 52 can indicate the temperature of the HV battery 18 to the controller 60 to provide feedback control of reducing the temperature of the HV battery 18.

In another embodiment, the controller 60 may receive a signal indicating the temperature of the HV battery 18 and generate a command signal increasing operation of the heat transfer device 50 to reduce the temperature of the HV battery 18 to a predetermined temperature. The predetermined temperature may correspond to a temperature of the HV battery 18 that maximizes the difference between battery energy in the HV battery 18 that is expected to be conserved from increasing operation of the heat transfer device 50 and energy expected to be used from the HV battery 18 to operate the heat transfer device 50. Furthermore, the predetermined temperature may be based on an amount of electric energy in the HV battery 18.

As shown in FIG. 1, the controller 60 is configured to transmit a command signal to the heat transfer device 50 to control operation of the heat transfer device 50. For example, the controller 60 can generate a command signal that increases operation of the heat transfer device 50 when the controller 60 determines that the user has elected to enhance the fuel economy of the HEV 14. In addition, the LD or controller 60 may be configured to compare various expected energy usages and energy savings to obtain an energy comparison that the controller 60 uses to generate the command signal. For example, the controller 60 may compare energy in the HV battery 18 that is expected to be conserved from increasing operation of the heat transfer device 50 and energy in the HV battery 18 that is expected to be used to operate the heat transfer device 50. In such an example, the controller 60 may control the heat transfer device 50 in an effort to maximize the difference between the battery energy expected to be conserved from increasing operation of the heat transfer device 50 and the battery energy expected to be used to operate the heat transfer device 50.

The command signal generated by the controller 60 controls how and when the controller 60 reduces a temperature of the HV battery 18. For example, the command signal can control the rate that the heat transfer device 50 transfers heat away from the HV battery 18, the time interval that the heat transfer device 50 transfers heat away from the HV battery 18, the frequency that the heat transfer device 50 transfers heat away from the battery 18, or a combination thereof.

Figure 2:
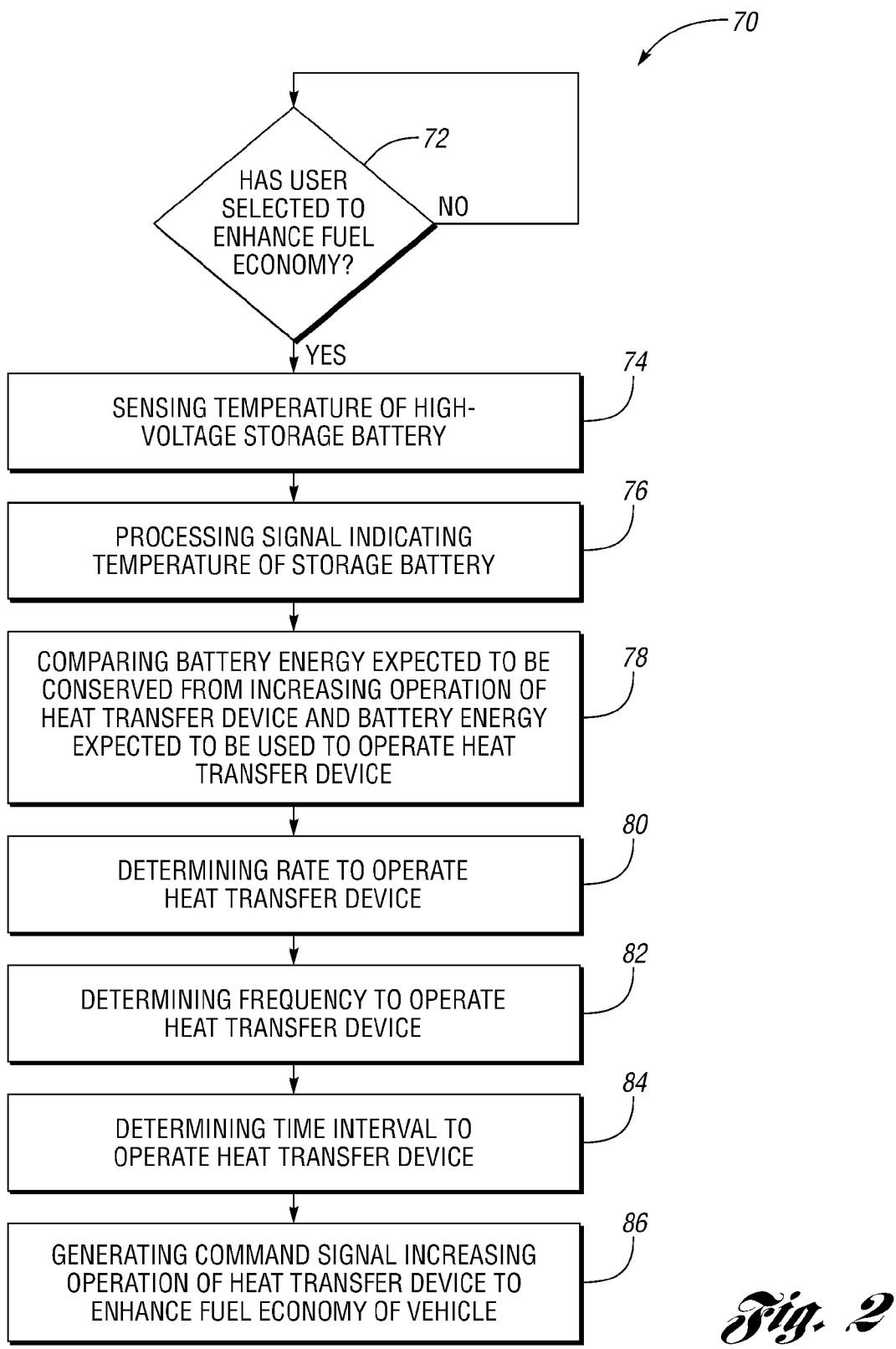
FIG. 2 is a flowchart diagram illustrating a method of enhancing fuel economy of the HEV in accordance with one embodiment.

With reference to FIG. 2, a flowchart diagram 70 is provided to generally illustrate steps of a method of enhancing fuel economy of a hybrid electric vehicle (HEV) in accordance with one embodiment. In addition to the steps shown in FIG. 2, a logic device or controller may be programmed with additional steps to provide additional functionality. Although the various steps shown in the flowchart diagram 70 appear to occur in a chronological sequence, at least some of the steps may occur in a different order, and some steps may be performed concurrently or not at all.

With reference to FIG. 2, the HEV 14 and its components illustrated in FIG. 1 are referenced throughout the discussion of the method to facilitate understanding of various aspects of the method. The method of enhancing fuel economy of the HEV 14 may be implemented through a computer algorithm, machine executable code, or a software program programmed into a suitable programmable logic device(s) of the HEV 14, such as the controller 60, the VSC/PCM 64, other controller in the HEV 14, or a combination thereof.

At decision block 72 of flowchart diagram 70, whether a user has selected or elected to enhance the fuel economy of the HEV 14 is determined. The controller 60 can determine whether the user has elected enhancement of the fuel economy of the HEV 14 either alone or in combination with the VSC/PCM 64. For example, the controller 60 may determine whether the user has elected enhancement of the fuel economy of the HEV 14 based on an input to the fuel economy input device 54, such as a user selecting a fuel economy setting.

At block 74, a temperature of the HV battery 18 is sensed. One or more thermal or temperature sensors 52 disposed in or near the HV battery 18 may sense the temperature of the HV battery 18. Once the temperature sensors 52 sense the temperature of the HV battery 18, the sensors 52 may generate a signal indicating the temperature of the HV battery 18.

At block 76, a signal indicating the temperature of the HV battery 18 is processed. The controller 60, such as the BCM 62, can process the signal indicating the temperature of the HV battery 18 either alone or in combination with the VSC/PCM 64. Furthermore, the controller 60 may process the signal indicating the temperature of the HV battery 18 to obtain one or more temperature levels of the HV battery 18. For example, the controller 60 may estimate or determine the temperature in the HV battery 18 based on an average of battery cell temperatures.

At block 78, battery energy expected to be conserved from increasing operation of the heat transfer device and battery energy expected to be used to operate the heat transfer device is compared to obtain an energy comparison. The controller 60 may obtain the energy comparison to generate the command signal by comparing the energy in the HV battery 18 that is expected to be conserved from increasing operation of the heat transfer device 50 and energy in the HV battery 18 that is expected to be used to operate the heat transfer device 50. Furthermore, the controller 60 may obtain multiple energy comparisons to determine a maximum difference between the battery energy expected to be conserved from increasing operation of the heat transfer device 50 and the battery energy expected to be used to operate the heat transfer device 50. Likewise, the controller 40 may command the heat transfer device 50 to obtain the maximum difference for enhancing fuel economy of the HEV 14.

At block 80, a rate to operate the heat transfer device 50 is determined. The controller 60 may determine the rate for enhancing fuel economy of the HEV 14 either alone or in combination with the VSC/PCM 64. The temperature level of the HV battery 18 is inversely proportional to the rate of operation of the heat transfer device 50. Thus, the commanded rate for the heat transfer device 50 may increase as temperature of the HV battery 18 increases. When temperature of the HV battery 18 increases, a greater rate of cooling or removing heat from the HV battery 18 via the heat transfer device 50 may be needed. Therefore, the controller 60 may increase the commanded rate for the heat transfer device 50 to transfer heat away from the HV battery 18. Likewise, the commanded rate for the heat transfer device 50 may decrease as the temperature of the HV battery 18 decreases. The commanded speed for the heat transfer device 50 may decrease to provide a lower rate of cooling and to conserve use of electric energy from the HV battery 18.

At block 82, a frequency to operate the heat transfer device 50 is determined. The controller 60 may determine the frequency for enhancing fuel economy of the HEV 14 either alone or in combination with the VSC/PCM 64.

The controller 60 may command the heat transfer device 50 to operate more frequently, such as at the increased rate, as temperature of the HV battery 18 increases since the temperature level of the HV battery 18 is inversely proportional to the frequency of operation of the heat transfer device 50. Thus, how often the heat transfer device 50 cools or removes heat from the HV battery 18 may increase when the temperature of the HV battery 18 increases. The controller 60 may increase the frequency that the heat transfer device 50 transfers heat away from the HV battery 18 at the increased rate to enhance the fuel economy of the HEV 14. In addition, the controller 60 may decrease the frequency that the heat transfer device 50 operates to conserve use of electric energy from the HV battery 18 and enhance the fuel economy of the HEV 14.

At block 84 of flowchart diagram 70, a time interval to operate the heat transfer device 50 is determined. The time interval refers to how long the heat transfer device 50 is to cool or remove heat from the HV battery 18 without significant interruption. The controller 60 may determine the time interval or operating duration of the heat transfer device 50 for enhancing fuel economy of the HEV 14 either alone or in combination with the VSC/PCM 64.

With continuing reference to block 84, the temperature level of the HV battery 18 is inversely proportional to the time interval or operating duration of the heat transfer device 50. The controller 60 may increase the operating duration of the heat transfer device 50, such as at the increased rate, as temperature of the HV battery 18 increases. Recall, the power limits of the HV battery 18 is reduced and less battery electric power is available for driving components in the transaxle 22 when the temperature of the HV battery 18 increases.

The controller 60 may increase the time interval that the heat transfer device 50 transfers heat away from the HV battery 18 at the increased rate to enhance the fuel economy of the HEV 14. In addition, the controller 60 may decrease the time interval or operating duration that the heat transfer device 50 operates to conserve use of electric energy from the HV battery 18 to enhance the fuel economy of the HEV 14. After lapse of the time interval, the controller 60 may control the heat transfer device 50 to operate at a new rate, such as a default rate for the heat transfer device 50.

At block 86, a command signal is generated to increase operation of the heat transfer device 50 to reduce a temperature of the HV battery 18 when a user has elected to enhance the fuel economy of the HEV 14. The controller 60 may generate the command signal either alone or in combination with the VSC/PCM 64. The command signal generated by the controller 60 and/or VSC/PCM 64 controls how and when the controller 60 reduces a temperature of the HV battery 18. For example, the command signal can control the rate that the heat transfer device 50 transfers heat away from the HV battery 18, the time interval that the heat transfer device 50 transfers heat away from the HV battery 18, the frequency that the heat transfer device 50 transfers heat away from the battery 18, or a combination thereof. For example, the controller 60 may generate the command signal increasing operation of the heat transfer device 50 to reduce the temperature of the HV battery 18 to a predetermined temperature.

With continuing reference to block 86, the controller 60 may be configured to generate the command signal based on an energy comparison. The energy comparison may be based on energy in the HV battery 18 that is expected to be conserved from increasing operation of the heat transfer device 50 compared to energy in the HV battery 18 that is expected to be used to operate the heat transfer device 50. In such an example, the controller 60 may generate the command signal in an effort to optimize a balance between cooling of the HV battery 18 and consuming electric power from the HV battery 18. This balance may be obtained by generating a command signal that maximizes the difference between the battery energy expected to be conserved from increasing operation of the heat transfer device 50 and the battery energy expected to be used to operate the heat transfer device 50. Thus, the controller 60 may determine the energy comparison to achieve the balance between cooling the HV battery 18 and consuming electric power from the HV battery 18.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for enhancing fuel economy of a hybrid electric vehicle with a storage battery and a heat transfer device, the system comprising:
   a logic device configured to determine whether a user has elected to enhance fuel economy of the vehicle, to receive temperature sensor input information to compare battery energy expected to be conserved from increased operation of the heat transfer device and battery energy expected to be used to operate the heat transfer device to generate the command signal, and to generate a command signal increasing operation of the heat transfer device to reduce temperature of the battery when the user has elected to enhance the fuel economy.

2. The system of claim 1 wherein the heat transfer device includes a fan to cool the high-voltage storage battery.

3. The system of claim 2 wherein increasing operation of the heat transfer device includes operating the fan at a higher speed to cool the battery at a higher rate.

4. The system of claim 1 further including a fuel economy input device allowing the user to elect enhancement of the fuel economy of the vehicle.

5. The system of claim 4 wherein the fuel economy input device is a manual user input device.

6. The system of claim 1 wherein increasing operation of the heat transfer device includes increasing a rate that the heat transfer device transfers heat away from the battery.

7. The system of claim 1 wherein increasing operation of the heat transfer device includes increasing a time interval that the heat transfer device transfers heat away from the battery.

8. The system of claim 1 wherein increasing operation of the heat transfer device includes increasing a frequency that the heat transfer device transfers heat away from the battery.

9. The system of claim 1 wherein the logic device is further configured to control the heat transfer device in an effort to maximize the difference between the battery energy expected to be conserved from increasing operation of the heat transfer device and the battery energy expected to be used to operate the heat transfer device.

10. The system of claim 1 wherein the logic device is further configured to receive a signal indicating the temperature of the high-voltage storage battery and to generate the command signal increasing operation of the heat transfer device to reduce the temperature of the battery to a predetermined temperature.

11. The system of claim 10 wherein the predetermined temperature corresponds to a temperature of the battery that maximizes the difference between battery energy expected to be conserved from increasing operation of the heat transfer device and battery energy expected to be used to operate the heat transfer device.

12. The system of claim 10 further including temperature sensors to sense the temperature of the battery and to generate the signal indicating the temperature of the battery.

13. A system for enhancing fuel economy of a hybrid electric vehicle with a high-voltage storage battery and a heat transfer device, the system comprising:
 a fuel economy input device for a user to elect enhancement of fuel economy of the vehicle; and
 a logic device in electrical communication with the fuel economy input device and configured to
  receive a temperature sensor input signal indicating a temperature of the high-voltage storage battery to compare battery energy expected to be conserved from increased operation of the heat transfer device and battery energy expected to be used to operate the heat transfer device to generate the command signal;
  determine whether the user has elected to enhance fuel economy of the vehicle; and
  generate a command signal increasing a rate that the heat transfer device transfers heat away from the battery based on the temperature of the battery when the user has elected to enhance the fuel economy of the vehicle.

14. The system of claim 13 wherein the heat transfer device includes a fan to transfer heat away from the battery.

15. The system of claim 13 wherein the logic device is further configured to compare battery energy expected to be conserved by increasing operation of the heat transfer device and battery energy expected to be used, the logic device further being configured to determine the rate that the heat transfer device transfers heat away from the battery based on the comparison.

16. A method of enhancing fuel economy of a hybrid electric vehicle with a high-voltage storage battery and a heat transfer device, the method comprising:
 determining whether a user has elected to enhance fuel economy of the vehicle;
 receiving temperature sensor input information to compare battery energy expected to be conserved from increased operation of the heat transfer device and battery energy expected to be used to operate the heat transfer device to generate the command signal, and
 generating a command signal increasing operation of the heat transfer device to reduce temperature of the battery when the user has elected to enhance the fuel economy.

17. The method of claim 16 wherein increasing operation of the heat transfer device comprises increasing a rate that the heat transfer device transfers heat away from the battery.

18. The method of claim 16 further including comparing battery energy expected to be conserved by increasing operation of the heat transfer device and battery energy expected to be used, and increasing operation of the heat transfer device based on the comparison.

19. The method of claim 16 further including receiving a signal indicating the temperature of the high-voltage storage battery and increasing operation of the heat transfer device to reduce the temperature of the battery to a predetermined temperature.

* * * * *